United States Patent
Bergquist et al.

(10) Patent No.: US 10,821,978 B2
(45) Date of Patent: Nov. 3, 2020

(54) METHOD TO CONTROL A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

(71) Applicant: Scania CV AB, Södertälje (SE)

(72) Inventors: Mikael Bergquist, Huddinge (SE); Mathias Björkman, Tullinge (SE); Johan Lindström, Nyköping (SE); Niklas Pettersson, Stockholm (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 15/511,612

(22) PCT Filed: Sep. 29, 2015

(86) PCT No.: PCT/SE2015/051021
§ 371 (c)(1),
(2) Date: Mar. 15, 2017

(87) PCT Pub. No.: WO2016/053170
PCT Pub. Date: Apr. 7, 2016

(65) Prior Publication Data
US 2017/0291607 A1    Oct. 12, 2017

(30) Foreign Application Priority Data
Sep. 29, 2014    (SE) .................................... 1451147

(51) Int. Cl.
*B60W 30/18*    (2012.01)
*B60K 6/365*    (2007.10)
(Continued)

(52) U.S. Cl.
CPC ....... *B60W 30/18036* (2013.01); *B60K 6/365* (2013.01); *B60K 6/445* (2013.01);
(Continued)

(58) Field of Classification Search
USPC .......................................... 701/22
See application file for complete search history.

(56) References Cited

U.S. PATENT DOCUMENTS 3,744,333 A * 7/1973 Hallberg .............. H01H 43/101
74/437
4,403,968 A * 9/1983 Heidrich ................ B63H 23/12
440/3

(Continued)

FOREIGN PATENT DOCUMENTS

DE        10021025 A1    11/2001
DE    102005040153 A1     3/2007

(Continued)

OTHER PUBLICATIONS

English Translation from Google Patents for DE102005049992A1.*

(Continued)

*Primary Examiner* — Jean Paul Cass
(74) *Attorney, Agent, or Firm* — Moore & Van Allen PLLC; W. Kevin Ransom

(57) ABSTRACT

Provided is a method to control a hybrid powertrain to achieve a reverse drive, wherein the hybrid powertrain comprises an internal combustion engine; a gearbox with an input and output shaft; a first planetary gear connected to the input shaft and a first main shaft; a second planetary gear connected to the first planetary gear and a second main shaft; first and second electrical machines respectively connected to the first and second planetary gears; one gear pair connected with the first main shaft and the output shaft; and one gear pair connected with the second main shaft and the (Continued)

output shaft, wherein the internal combustion engine is connected with the first planetary gear via the input shaft. The method comprises: ensuring that moveable component parts in the first planetary gear are disconnected from each other and/or that moveable component parts in the second planetary gear are disconnected from each other; ensuring that an output shaft in the internal combustion engine is prevented from rotating; and controlling the first electrical machine and/or second electrical machine to achieve a negative torque in the output shaft via the first main shaft and/or second main shaft.

19 Claims, 5 Drawing Sheets

(51) Int. Cl.
| | |
|---|---|
| B60K 6/445 | (2007.10) |
| B60K 6/547 | (2007.10) |
| F16H 3/72 | (2006.01) |
| B60W 10/02 | (2006.01) |
| B60W 20/14 | (2016.01) |
| B60W 20/30 | (2016.01) |
| B60K 6/543 | (2007.10) |
| B60W 10/08 | (2006.01) |
| B60W 10/11 | (2012.01) |
| B60W 20/20 | (2016.01) |
| F16H 37/04 | (2006.01) |
| F16H 3/00 | (2006.01) |
| B60K 6/54 | (2007.10) |

(52) U.S. Cl.
CPC .............. *B60K 6/543* (2013.01); *B60K 6/547* (2013.01); *B60W 10/02* (2013.01); *B60W 10/08* (2013.01); *B60W 10/11* (2013.01); *B60W 20/14* (2016.01); *B60W 20/20* (2013.01); *B60W 20/30* (2013.01); *F16H 3/728* (2013.01); *F16H 37/046* (2013.01); *B60K 2006/541* (2013.01); *B60W 2510/1005* (2013.01); *B60W 2710/083* (2013.01); *B60W 2710/10* (2013.01); *B60W 2710/1005* (2013.01); *B60Y 2200/92* (2013.01); *F16H 2003/008* (2013.01); *F16H 2200/2007* (2013.01); *Y02T 10/6239* (2013.01); *Y10S 903/911* (2013.01); *Y10S 903/918* (2013.01); *Y10S 903/919* (2013.01); *Y10S 903/93* (2013.01)

(56) References Cited

U.S. PATENT DOCUMENTS

| | | | |
|---|---|---|---|
| 5,407,401 A | 4/1995 | Bullmer et al. | |
| 5,558,595 A | 9/1996 | Schmidt et al. | |
| 5,916,050 A | 6/1999 | Coutant et al. | |
| 6,044,931 A | 4/2000 | Reed, Jr. et al. | |
| 6,203,463 B1 | 3/2001 | Casey et al. | |
| 6,371,882 B1 | 4/2002 | Casey et al. | |
| 6,558,283 B1 | 5/2003 | Schnelle | |
| 6,811,508 B2 | 11/2004 | Tumback | |
| 7,128,680 B2 | 10/2006 | Holmes | |
| 8,231,491 B2 | 7/2012 | Oba et al. | |
| 8,251,165 B2 | 8/2012 | Katsuta et al. | |
| 8,257,213 B2 | 9/2012 | Komada et al. | |
| 9,073,546 B2 | 7/2015 | Kuroda et al. | |
| 9,770,969 B2 | 9/2017 | Bjrkman et al. | |
| 2003/0166429 A1 | 9/2003 | Tumback | |
| 2004/0112317 A1 | 6/2004 | Tumback et al. | |
| 2005/0227803 A1 | 10/2005 | Holmes | |
| 2005/0279073 A1* | 12/2005 | Clauss | A01D 41/142 56/364 |
| 2007/0123384 A1 | 5/2007 | Schon et al. | |
| 2007/0243966 A1 | 10/2007 | Holmes et al. | |
| 2008/0053723 A1 | 3/2008 | Kozarekar | |
| 2008/0103002 A1 | 5/2008 | Holmes | |
| 2008/0125265 A1* | 5/2008 | Conlon | B60K 6/46 475/5 |
| 2009/0048747 A1* | 2/2009 | Stridsberg | B60W 10/11 701/55 |
| 2009/0320629 A1 | 12/2009 | Akashi et al. | |
| 2010/0216584 A1 | 8/2010 | Lutoslawski | |
| 2011/0202222 A1* | 8/2011 | Yamamoto | B60W 10/115 701/22 |
| 2012/0021861 A1 | 1/2012 | Sakai et al. | |
| 2013/0260936 A1 | 10/2013 | Takei et al. | |
| 2013/0337961 A1 | 12/2013 | Kaltenbach | |
| 2014/0024490 A1 | 1/2014 | Bangura et al. | |
| 2014/0046527 A1 | 2/2014 | Ito et al. | |
| 2014/0150604 A1 | 6/2014 | Kaltenbach | |
| 2014/0194238 A1 | 7/2014 | Ono et al. | |
| 2015/0038286 A1* | 2/2015 | Hane | B60K 6/26 477/3 |
| 2015/0072823 A1 | 3/2015 | Rintoo | |
| 2015/0158484 A1* | 6/2015 | Sato | B60W 20/40 701/22 |
| 2015/0167794 A1 | 6/2015 | Morio et al. | |
| 2015/0184726 A1 | 7/2015 | Rekow et al. | |
| 2015/0292606 A1 | 10/2015 | Lubke et al. | |
| 2015/0292610 A1 | 10/2015 | Rintoo | |
| 2016/0264127 A1* | 9/2016 | Nilsson | B60K 6/48 |
| 2017/0015299 A1* | 1/2017 | Bjorkman | B60K 6/365 |
| 2017/0015300 A1* | 1/2017 | Lindstrom | B60K 6/365 |
| 2017/0015303 A1* | 1/2017 | Bjorkman | B60K 6/442 |
| 2017/0015304 A1* | 1/2017 | Bjorkman | F16H 37/042 |
| 2017/0015305 A1* | 1/2017 | Bjorkman | B60K 6/547 |
| 2017/0015306 A1* | 1/2017 | Bjorkman | B60K 6/365 |
| 2017/0021819 A1* | 1/2017 | Lindstrom | F16H 63/502 |
| 2017/0166202 A1* | 6/2017 | Kobayashi | B60W 50/0097 |
| 2017/0282700 A1 | 10/2017 | Bergquist et al. | |
| 2017/0305256 A1 | 10/2017 | Bergquist et al. | |
| 2018/0339698 A1* | 11/2018 | Hock | B60W 20/00 |

FOREIGN PATENT DOCUMENTS

| | | |
|---|---|---|
| DE | 102005049992 A1 * | 4/2007 |
| DE | 102007022129 A1 | 11/2008 |
| DE | 102008043732 A1 | 6/2009 |
| DE | 102011005028 A1 | 9/2012 |
| DE | 102011080068 A1 | 1/2013 |
| DE | 102011080069 A1 | 1/2013 |
| EP | 0724977 A1 | 8/1996 |
| SE | 1350392 A1 | 9/2014 |
| SE | 1350394 A1 | 9/2014 |
| SE | 1450306 A1 | 9/2014 |
| SE | 1450308 A1 | 9/2014 |
| WO | 2008046185 A1 | 4/2008 |
| WO | 2014158073 A1 | 3/2014 |
| WO | WO2014067734 A1 | 5/2014 |
| WO | 2014158074 A1 | 10/2014 |
| WO | 2014158076 A1 | 10/2014 |
| WO | WO-2014158076 A1 * | 10/2014 ............... B60K 1/02 |

OTHER PUBLICATIONS

English Translation from Google Patents for EP2794316B1.*
English Translation from Google Patents for DE102007005438A1.*
International Preliminary Report on Patentability for PCT/SE2015/051021 dated Apr. 4, 2017.
Korean Search Report for Korean Patent Application No. 10-2017-7010678 dated Apr. 12, 2018.
International Search Report for PCT/SE15/051021 dated Jan. 11, 2016.
Written Opinion of the International Searching Authority for PCT/SE15/051021 dated Jan. 11, 2016.

(56) References Cited

OTHER PUBLICATIONS

SCANIA CV AB, Swedish Application No. 1451147-1, Office Action, dated Jun. 1, 2015.

* cited by examiner

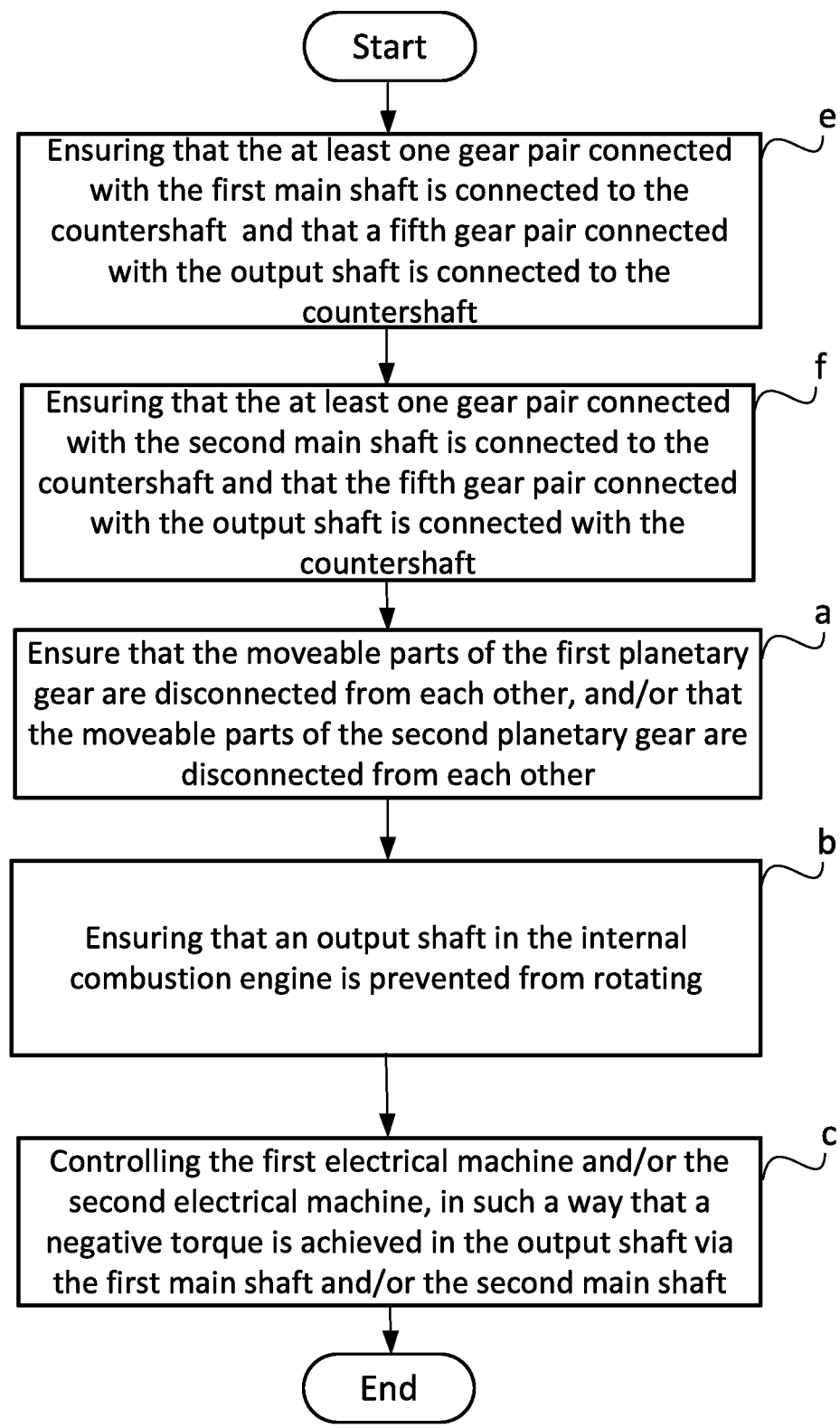

METHOD TO CONTROL A HYBRID POWERTRAIN, VEHICLE COMPRISING SUCH A HYBRID POWERTRAIN, COMPUTER PROGRAM FOR CONTROLLING SUCH A HYBRID POWERTRAIN, AND A COMPUTER PROGRAM PRODUCT COMPRISING PROGRAM CODE

CROSS-REFERENCE TO RELATED APPLICATION(S)

This application is a national stage application (filed under 35 § U.S.C. 371) of PCT/SE2015/051021, filed Sep. 29, 2015 of the same title, which, in turn claims priority to Swedish Application No. 1451147-1 filed Sep. 29, 2014 of the same title; the contents of each of which are hereby incorporated by reference.

FIELD OF THE INVENTION

The present invention relates to a method to control a hybrid powertrain in a vehicle.

BACKGROUND OF THE INVENTION

Hybrid vehicles may be driven by a primary engine, which may be an internal combustion engine, and a secondary engine, which may be an electrical machine. The electrical machine is equipped with at least one energy storage device, such as an electro-chemical energy storage device, for storage of electric power, and control equipment to control the flow of electric power between the energy storage device and the electrical machine. The electrical machine may thus alternately operate as an engine and as a generator, depending on the vehicle's operating mode. When the vehicle is braked, the electrical machine generates electric power, which is stored in the energy storage device. This is usually referred to as regenerative braking, which entails that the vehicle is decelerated with the help of the electrical machine and the internal combustion engine. The stored electric power is used later for operation of the vehicle.

A gearbox in a hybrid vehicle may comprise a planetary gear. The planetary gear usually comprises three components, which are rotatably arranged in relation to each other, namely a sun wheel, a planetary wheel carrier and an internal ring gear. With knowledge about the number of teeth in the sun wheel and the ring gear, the mutual rotational speeds of the three components may be determined during operation. One of the components of the planetary gear may be connected with an output shaft in an internal combustion engine. This component of the planetary gear thus rotates with a rotational speed corresponding to the rotational speed of the output shaft in the internal combustion engine. A second component in the planetary gear may be connected with an input shaft to a transmission device. This component of the planetary gear thus rotates with the same rotational speed as the input shaft to the transmission device. A third component in the planetary gear is used to achieve hybrid operation, connected with a rotor in an electrical machine. This component in the planetary gear thus rotates with the same rotational speed as the rotor of the electrical machine, if they are directly connected with each other. Alternatively, the electrical machine may be connected with the third component of the planetary gear via a transmission that has a gearing. In this case, the electrical machine and the third component in the planetary gear may rotate with different rotational speeds. The engine speed and/or the torque of the electrical machine may be controlled steplessly. During operating modes when the input shaft to the transmission device must be provided with a rotational engine speed and/or torque, a control device having knowledge about the engine speed of the internal combustion engine calculates the rotational speed with which the third component must be operated, in order for the input shaft to the transmission device to obtain the desired rotational speed. A control device activates the electrical machine in such a manner that it provides the third component with the calculated engine speed, and thus the input shaft to the transmission device with the desired rotational speed.

By connecting the internal combustion engine's output shaft, the electrical machine's rotor and the transmission device's input shaft with a planetary gear, the conventional coupling mechanism may be avoided. At acceleration of the vehicle, an increased torque must be delivered from the internal combustion engine and the electrical machine to the transmission device, and further to the vehicle's driving wheels. Since both the internal combustion engine and the electrical machine are connected with the planetary gear, the largest possible torque delivered by the internal combustion engine and the electrical machine will be limited by one of these drive units; i.e. the one whose maximum torque is lower than the other drive unit's maximum torque, having regard to the gearing between them. In case the electrical machine's highest torque is lower than the internal combustion engine's highest torque, having regard to the gearing between them, the electrical machine will not be able to generate a sufficiently large reaction torque to the planetary gear, entailing that the internal combustion engine may not transfer its highest torque to the transmission device and further to the vehicle's driving wheels. Thus, the highest torque that may be transferred to the transmission device is limited by the electrical machine's strength. This is also apparent from the so-called planet equation.

Using a conventional coupling, which disconnects the gearbox's input shaft from the internal combustion engine during shifting processes in the gearbox, entails disadvantages, such as heating of the coupling discs, resulting in wear of the coupling discs and an increased fuel consumption. A conventional coupling mechanism is also relatively heavy and costly. It also occupies a relatively large space in the vehicle.

In a vehicle, the space available for the drive arrangement is often limited. If the drive arrangement comprises several components, such as an internal combustion engine, an electrical machine, a gearbox and a planetary gear, the construction must be compact. If there are additional components, such as a regenerative braking device, the requirements that the component parts must have a compact construction are even more stringent. At the same time, the component parts in the drive arrangement must be designed with dimensions that are able to absorb the required forces and torque.

For some types of vehicles, especially heavy goods vehicles and buses, a large number of gear steps is required. Thus, the number of component parts in the gearbox increases, which must also be dimensioned to be able to absorb large forces and torque arising in such heavy goods vehicles. This results in an increase of the size and weight of the gearbox.

There are also requirements for high reliability and high operational security of the components comprised in the drive device. In case the gearbox comprises multi-plate couplings, a wear arises, which impacts the reliability and life of the gearbox.

At regenerative braking, kinetic energy is converted into electric power, which is stored in an energy storage device, such as accumulators. One factor impacting on the life of the energy storage device is the number of cycles in which the energy storage device provides and extracts power to and from the electrical machines. The more cycles, the shorter the life of the energy storage device.

Under some operating conditions, it is desirable to shut off the internal combustion engine, with the objective of saving fuel and to avoid cooling down of the internal combustion engine's exhaust treatment system. When a torque addition is required in the hybrid powertrain, or when the energy storage device must be charged, the internal combustion engine must be started quickly and efficiently.

The document EP-B1-1126987 shows a gearbox with double planetary gears. The sun wheel of each planetary gear is connected to an electrical machine, and the internal ring gears of the planetary gears are connected with each other. The planetary wheel carrier in each planetary gear is connected to a number of gear pairs, so that an infinite number of gear steps is obtained. Another document, EP-B1-1280677, also shows how the planetary gears may be bridged with a gear step arranged on the internal combustion engine's output shaft.

Document US-A1-20050227803 shows a vehicle transmission with two electrical machines, connected to the respective sun wheels in two planetary gears. The planetary gears have a common planetary wheel carrier, which is connected to the transmission's input shaft.

The document WO2008/046185-A1 shows a hybrid transmission with two planetary gears, wherein one electrical machine is connected to one of the planetary gears and a double coupling interacts with the second planetary gear. Both planetary gears also interact with each other via a cogwheel transmission.

SUMMARY OF THE INVENTION

Despite prior art solutions in the field, there is a need to further develop a method to control a hybrid powertrain, in order to achieve a negative torque in the output shaft in an advantageous manner.

The objective of the present invention is accordingly to provide a novel and advantageous method to control a hybrid powertrain.

Another objective of the invention is to achieve a negative torque in the output shaft in an advantageous manner.

Another objective of the invention is to provide a novel and advantageous computer program to control a hybrid powertrain.

The method according to the invention provides an efficient and reliable method to control a hybrid powertrain in order to achieve reverse drive, comprising an internal combustion engine; a gearbox with an input shaft and an output shaft; a first planetary gear, connected to the input shaft and a first main shaft; a second planetary gear, connected to the first planetary gear and a second main shaft; a first electrical machine, connected to the first planetary gear; a second electrical machine, connected to the second planetary gear; at least one gear pair, connected with the first planetary gear and the output shaft; and at least one gear pair, connected with the second planetary gear and the output shaft, wherein the internal combustion engine is connected with the first planetary gear via the input shaft. The method suitably comprises the step of ensuring that the moveable parts of the first planetary gear are disconnected from each other and/or that the moveable parts of the second planetary gear are disconnected from each other. The method also comprises the steps of ensuring that an output shaft in the internal combustion engine is prevented from rotating, and of controlling the first electrical machine and/or the second electrical machine, in such a manner that a negative torque is achieved in the output shaft via the first main shaft and/or the second main shaft. The negative torque in the output shaft acts to achieve a negative rotational speed direction in the output shaft. A negative rotational speed direction in the output shaft entails, when the hybrid powertrain is arranged in a vehicle, that the output shaft rotates in a direction which is opposite to the rotational speed direction when the vehicle is driven in a forward direction. In this manner, the vehicle may be reversed, without the need to engage a special reverse gear.

The fact that the moveable component parts in the first planetary gear are disconnected from each other suitably entails that a first sun wheel and a first planetary wheel carrier, both arranged in the first planetary gear, are disconnected from each other. Similarly, the fact that the moveable component parts comprised in the second planetary gear are disconnected from each other suitably entails that a second sun wheel and a second planetary wheel carrier, both arranged in the second planetary gear, are disconnected from each other. The fact that the moveable parts of each respective planetary gear are disconnected from each other is defined as the moveable parts not being locked to each other.

According to one aspect of the invention, the method comprises first a decision, as to whether the first electrical machine and/or the second electrical machine should be controlled in order to achieve a negative torque in the output shaft. Subsequently the movable parts in the first planetary gear are disconnected in such cases, where the first electrical machine will be controlled in order to achieve a negative torque in the output shaft, and the moveable parts are thus disconnected in the second planetary gear in such cases, where the second electrical machine will be controlled in order to achieve a negative torque in the output shaft.

A first and second coupling device is arranged between the planetary wheel carrier and the sun wheel of the respective planetary gears. The task of the coupling devices is to lock the respective planetary wheel carriers with the sun wheel. When the planetary wheel carrier and the sun wheel are connected with each other, the power from the internal combustion engine will pass through the planetary wheel carrier, the coupling device, the sun wheel and further along to the gearbox, which entails that the planetary wheels do not absorb any torque. This entails that the dimension of the planetary wheels may be adapted only to the electrical machine's torque, instead of to the internal combustion engine's torque, which in turn means the planetary wheels may be designed with smaller dimensions. Thus, a drive arrangement according to the invention is obtained, which has a compact construction, a low weight and a low manufacturing cost.

In order to release a planetary gear's planetary wheel carrier and sun wheel from each other, the first and/or second electrical machine is controlled, in such a way that torque balance is achieved in the planetary gear. Torque balance relates to a state where a torque acts on a ring gear arranged in the planetary gear, representing the product of the torque acting on the planetary wheel carrier of the planetary gear and the gear ratio of the planetary gear, while simultaneously a torque acts on the planetary gear's sun wheel, representing the product of the torque acting on the planetary wheel carrier and (1—the planetary gear's gear ratio). In the event two of the planetary gear's component parts, i.e. the sun wheel, the internal ring gear or planetary wheel carrier, are connected with the use of a coupling device, this coupling device does not transfer any torque between the planetary gear's parts when torque balance prevails. Accordingly, the coupling device may easily be shifted and the planetary gear's component parts may be disconnected.

The coupling devices and the locking mechanisms preferably comprise an annular sleeve, which is shifted axially between a connected and a disconnected state. The sleeve encloses, substantially concentrically, the gearbox's rotating components and is moved between the connected and disconnected state with a power element. Thus, a compact construction is obtained, with a low weight and a low manufacturing cost.

The output shaft of the internal combustion engine is connected with the first planetary wheel carrier, arranged in the first planetary gear, and the step of preventing rotation of the output shaft suitably comprises ensuring that a locking device is locked, so that the planetary wheel carrier is locked to the gear house of the gearbox. If the internal combustion engine rotates when the method described herein is initiated, the internal combustion engine and/or the first electrical machine and/or the second electrical machine is suitably controlled in such a manner that the internal combustion engine's output shaft is substantially at a standstill, before the locking device is locked. By locking the internal combustion engine's output shaft and the first planetary wheel carrier with the gearbox's housing with the use of the locking device, the gearbox, and thus the vehicle, becomes adapted for electric drive by the electrical machines. The electrical machines thus emit a torque to the output shaft of the gearbox. Alternatively, the step of preventing rotation of the output shaft of the internal combustion engine comprises that a braking element, arranged in connection with the output shaft, is controlled in such a way that the output shaft of the internal combustion engine is decelerated to a standstill.

The electrical machines, which are connected to the planetary gears, may generate power and/or supply torque depending on the desired operating mode. The electrical machines may also, in certain operating modes, supply each other with power.

The first planetary gear is connected with the first main shaft, and the second planetary gear is connected with the second main shaft. The first planetary wheel carrier in the first planetary gear is connected with the second sun wheel of the second planetary gear. The first sun wheel in the first planetary gear is connected with the first main shaft, and the second planetary wheel carrier in the second planetary gear is connected with the second main shaft. Thus, a transmission is obtained, which shifts gears without torque interruption.

The gearbox is preferably equipped with a number of gear pairs arranged between the first main shaft and a countershaft, and between the second main shaft and the countershaft, respectively. These gear pairs are connected to the output shaft via the countershaft. The gear pairs preferably comprise cogwheels, which may be mechanically locked to and disconnected from the countershaft. Thus, a number of fixed gear steps are obtained, which may be shifted without torque interruption. The cogwheels that may be locked on the countershaft also result in a compact construction with high reliability and high operational security. Alternatively, pinion gears in the gear pairs may be arranged to be lockable with and disconnectable from the first or second main shaft.

Suitably, the at least one gear pair connected with the first main shaft comprises a pinion gear and a cogwheel in engagement with each other, which first pinion gear is fixedly arranged with the first main shaft, and which first cogwheel is connectable and disconnectable arranged on a countershaft.

Suitably, the at least one gear pair connected with the second main shaft comprises a pinion gear and a cogwheel in engagement with each other, which pinion gear is fixedly arranged with the second main shaft, and which second cogwheel is connectable and disconnectable arranged on the countershaft.

Each of the gear pairs has a gearing, which is adapted to the vehicle's desired driving characteristics. The gear pair with the highest gearing, in relation to the other gear pairs, is suitably connected when the lowest gear is engaged.

With the gearbox according to the invention conventional slip couplinges between the internal combustion engine and the gearbox may be avoided.

According to one aspect of the present invention the negative torque is achieved in the output shaft by way of—before the disconnection of the first and/or the second planetary gear's moveable parts—ensuring that a path for torque transmission via the gearbox has been established. Preferably, the method comprises—before the disconnection of the first and/or the second planetary gear's moveable parts—ensuring that the output shaft is connected with the first and/or the second electrical machine. In this manner, torque transmission from the first and/or the second electrical machine to the output shaft is facilitated.

According to one aspect of the present invention, the negative torque in the output shaft is achieved by way of—before the disconnection of the first and/or the second planetary gear's moveable parts—ensuring that the main shaft connected with the first planetary gear and the output shaft are connected with the use of a coupling mechanism. In this manner, a direct gear is achieved, whereat the first electrical machine may achieve a negative torque in the output shaft without any connected gear pair. Preferably the connection of the first main shaft with the output shaft is achieved by way of achieving a synchronous rotational speed between the first main shaft and the output shaft, whereat the coupling mechanism is shifted, so that it connects the first main shaft and the output shaft.

According to one aspect of the present invention, the negative torque in the output shaft is achieved by way of—before the disconnection of the moveable parts of the first and/or the second planetary gear—ensuring that the at least one gear pair connected with the first main shaft is connected to the countershaft, and that a fifth gear pair connected with the output shaft is connected with the countershaft.

Preferably, the step comprises controlling the first electrical machine and/or the second electrical machine in such a manner that a negative torque is achieved in the output shaft, controlling the first electrical machine, in order to achieve a rotation of the first electrical machine in a first direction, whereat the output shaft is made to rotate in an opposite, second direction. The first direction is a positive direction. Suitably, the first electrical machine is controlled in such a way that it emits a positive torque, so that a rotation of the first electrical machine in the first direction is achieved. The positive torque from the first electrical machine acts on the first sun wheel, and thus on the first main shaft, so that they may rotate in a second direction, opposite to the first direction. That is to say, the positive torque from the first electrical machine results in the first sun wheel, and thus the first main shaft, being able to obtain a negative rotational speed direction. In such cases where the first main shaft and the output shaft are connected via a coupling mechanism, the output shaft thus obtains the same negative rotational speed direction as the first main shaft. In such cases where a gear pair connected with the first planetary gear is connected to the countershaft, and where the fifth gear pair connected to the output shaft is connected to the countershaft, a negative rotational speed direction of the first main shaft entails that the countershaft will obtain a positive rotational speed direction. Since the countershaft is connected with the output shaft via the fifth gear pair, a positive rotational speed direction in the countershaft will entail that the output shaft obtains a negative rotational speed direction. By controlling the first electrical machine in such a way that it generates a positive torque, a negative rotational speed direction is thus achieved in the output shaft in a flexible manner.

According to one aspect of the present invention, the method comprises the additional step—before the disconnection of the first and/or the second planetary gear's moveable part—, of ensuring that the at least one gear pair connected with the second main shaft is connected to the countershaft, and that the fifth gear pair connected with the output shaft is connected to the countershaft.

Preferably the step comprises controlling the first electrical machine and/or the second electrical machine in such a manner that a negative torque is achieved in the output shaft, controlling the second electrical machine in order to achieve a rotation of the second electrical machine in a second direction, wherein the output shaft is made to rotate in the same, second direction. The second direction is a negative direction. Suitably, the second electrical machine is controlled in such a way that it emits a negative torque, so that the rotation of the second electrical machine in the second direction is achieved. The negative torque from the second electrical machine acts on the second planetary wheel carrier, and thus on a second main shaft connected with the second planetary wheel carrier, so that they may rotate in the same, second direction. That is to say, the result of the negative torque from the second electrical machine is that the second planetary wheel carrier and the second main shaft may obtain a negative rotational speed direction. By connecting a gear pair connected with the second planetary gear with the countershaft, the countershaft obtains a rotational speed direction that is opposite to the second main shaft. When the second electrical machine is controlled in order to achieve a negative torque in the output shaft, and this results in the second main shaft obtaining a negative rotational speed direction, the countershaft obtains a positive rotational speed direction. Since the countershaft is connected with the output shaft via the fifth gear pair, a positive rotational speed direction in the countershaft will entail that the output shaft may obtain a negative rotational speed direction.

The negative torque in the output shaft may thus be transferred from the respective first and the second electrical machine, via the first main shaft and/or the second main shaft.

BRIEF DESCRIPTION OF THE DRAWINGS

Below is a description, as an example, of preferred embodiments of the invention with reference to the enclosed drawings, on which:

FIG. 3a-3c shows flow charts relating to methods to control a hybrid powertrain according to the present invention.

DETAILED DESCRIPTION OF THE INVENTION

Figure 1:
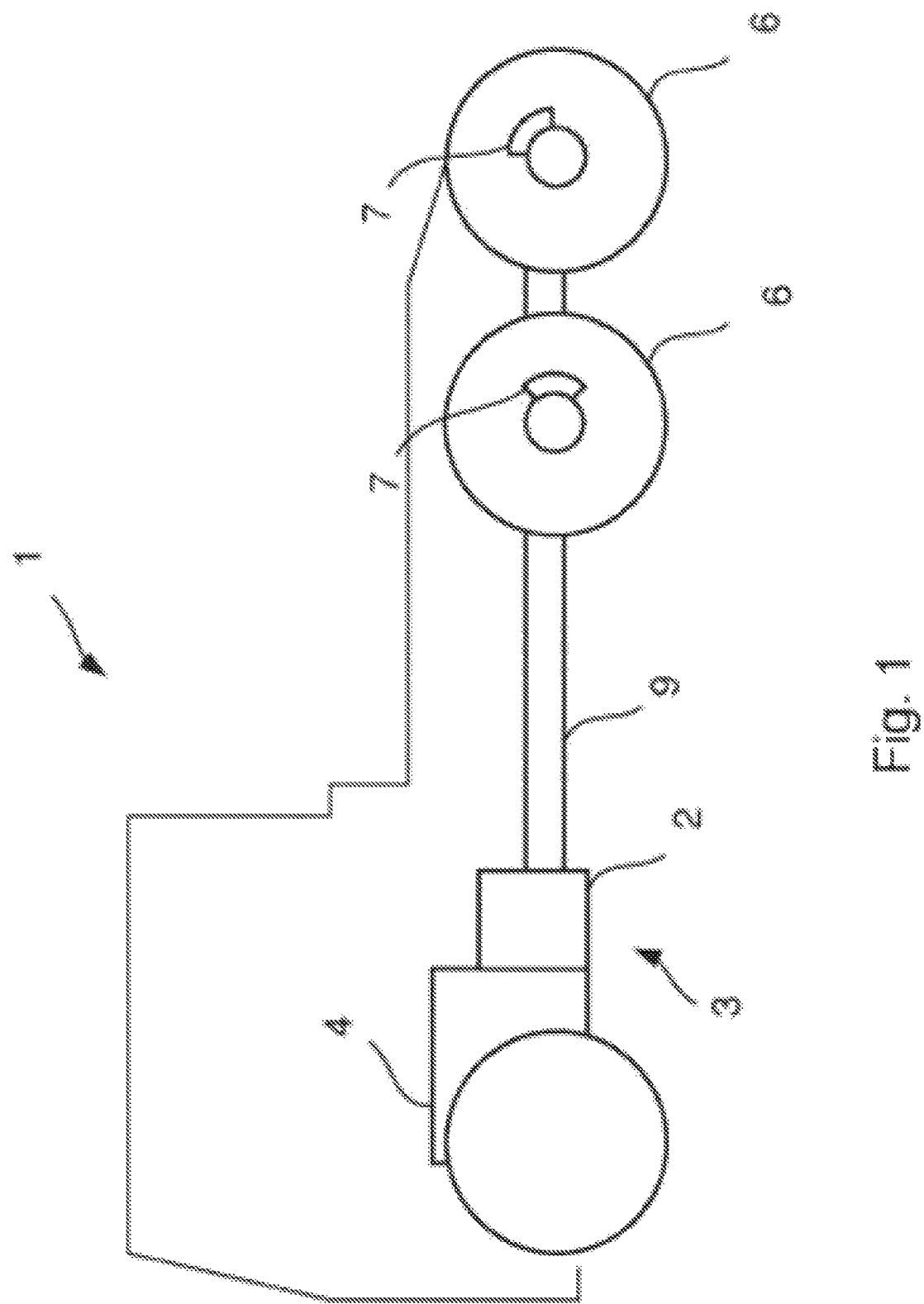
FIG. 1 schematically shows a side view of a vehicle with hybrid powertrain, arranged to be controlled according to the method, according to the present invention.

FIG. 1 shows a schematic side view of a vehicle 1, comprising a gearbox 2 and an internal combustion engine 4, which are comprised in a hybrid powertrain 3. The internal combustion engine 4 is connected to the gearbox 2, and the gearbox 2 is further connected to the driving wheels 6 of the vehicle 1 via a propeller shaft 9. The driving wheels 6 are equipped with brake devices 7 to brake the vehicle 1.

Figure 2:
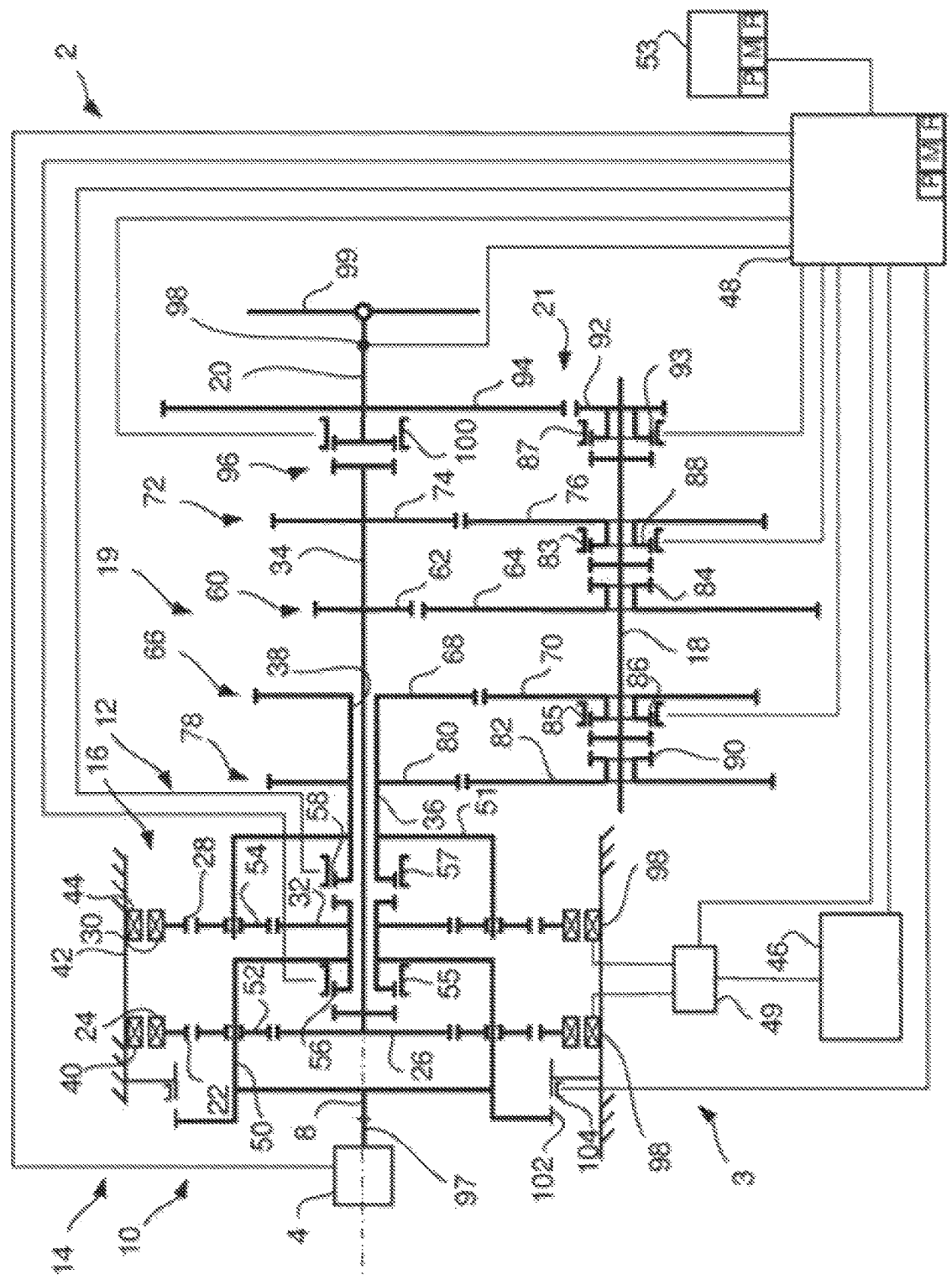
FIG. 2 shows a schematic side view of a hybrid powertrain, arranged to be controlled according to the method, according to the present invention.

FIG. 2 shows a schematic side view of a hybrid powertrain 3 with a gearbox 2, comprising an input shaft 8, a first and a second planetary gear 10 and 12, respectively, a first and a second electrical machine 14 and 16, respectively, a countershaft 18 and an output shaft 20. The hybrid powertrain 3 comprises an internal combustion engine 4 connected to the gearbox 2. The internal combustion engine 4 is connected with the gearbox 2 via the input shaft 8 of the gearbox. The internal combustion engine has an output shaft 97. The output shaft 97 of the internal combustion engine 4 is connected to the input shaft of the gearbox 2. The first planetary gear 10 has a first internal ring gear 22, to which a first rotor 24 in the first electrical machine 14 is connected. The first planetary gear 10 also has a first sun wheel 26 and a first planetary wheel carrier 50. The first planetary gear 10 is connected to a first main shaft 34. The first main shaft 34 is connected with the first sun wheel 26, arranged in the first planetary gear 10. The second planetary gear 12 has a second internal ring gear 28, to which a second rotor 30 of the second electrical machine 16 is connected. The second planetary gear 12 has a second sun wheel 32 and a second planetary wheel carrier 51. The second planetary gear 12 is connected to a second main shaft 36. The first and the second sun wheels 26 and 32, respectively, are coaxially arranged, which, according to the embodiment displayed, entails that a first main shaft 34 arranged on the first sun wheel 26 extends inside a second main shaft 36, which is arranged on the second planetary wheel carrier 51 and equipped with a central bore 38. It is also possible to arrange the first main shaft 34 in parallel with and next to the second main shaft 36. In this case, the countershaft 18 is suitably arranged between the first main shaft 34 and the second main shaft 36, and the torque may be extracted directly from the countershaft 18. The countershaft 18 thus constitutes, in this case, the output shaft 20.

The internal combustion engine 4 is connected with the first planetary wheel carrier 50, and the first planetary wheel carrier 50 is connected with the second sun wheel 32.

The first electrical machine 14 is equipped with a first stator 40, which is connected to the vehicle 1, via a gear housing 42 surrounding the gearbox 2. The second electrical machine 16 is equipped with a second stator 44, which is connected to the vehicle 1, via a gear housing 42 surrounding the gearbox 2. The first and the second electrical machine 16 are connected to an energy storage device 46, such as a battery, which, depending on the vehicle's 1 operating mode, operates the electrical machines 14 and 16.

At other operating modes, the electrical machines 14 and 16, respectively, may work as generators, whereat power is supplied to the energy storage device 46. An electronic control device 48 is connected to the energy storage device 46 and controls the supply of power to the electrical machines 14 and 16. Preferably the energy storage device 46 is connected to the electrical machines 14 and 16, respectively, via a switch 49, which is connected to the control device 48. In some operating modes, the electrical machines 14 and 16, respectively, may also operate each other. Electric power is then led from one of the electrical machines 14, 16 to the second electrical machine 14, 16 via the switch 49, connected to the electrical machines 14, 16. Thus, it is possible to achieve a power balance between the electrical machines 14, 16. Another computer 53 may also be connected to the control device 48 and the gearbox 2.

The first planetary gear 10 is equipped with a first planetary wheel carrier 50, on which a first set of planetary wheels 52 is mounted. The second planetary gear 12 is equipped with a second planetary wheel carrier 51, on which a second set of planetary wheels 54 is mounted. The second main shaft 36 is connected with the second planetary wheel carrier 51, arranged in the second planetary gear 12. The first set of planetary wheels 52 interacts with the first internal ring gear 22 and the first sun wheel 26. The second set of planetary wheels 54 interacts with the second internal ring gear 28 and the second sun wheel 32. The input shaft 8 of the gearbox 2 is connected with the first planetary wheel carrier 50.

A first coupling device 56 is arranged between the first sun wheel 26 and the first planetary wheel carrier 50. By arranging the first coupling device 56 in such a way that the first sun wheel 26 and the first planetary wheel carrier 50 are connected with each other, and may therefore not rotate in relation to each other, the first planetary wheel carrier 50 and the first sun wheel 26 will rotate with equal rotational speeds.

A second coupling device 58 is arranged between the second sun wheel 32 and the second planetary wheel carrier 51. By arranging the second coupling device 58 in such a way that the second sun wheel 32 and the second planetary wheel carrier 51 are connected with each other, and may therefore not rotate in relation to each other, the second planetary wheel carrier 51 and the first sun wheel 32 will rotate with equal rotational speeds.

Preferably, the first and second coupling devices 56, 58 comprise a first and a second splines-equipped coupling sleeve 55 and 57, respectively, which is axially shiftable on a splines-equipped section on the first and second, respectively, planetary wheel carrier 50 and 51, and on a splines-equipped section on the respective sun wheels 26 and 32. By shifting the respective coupling sleeve 55, 57 in such a manner that the splines-equipped sections are connected via the respective coupling sleeves 55, 57, the first planetary wheel carrier 50 and the first sun wheel 26, as well as the second planetary wheel carrier 51 and the second sun wheel 32, respectively, become mutually interlocked with each other and may not rotate in relation to each other.

The first and second coupling device 56, 58, according to the embodiment displayed in FIG. 2, are arranged between the first sun wheel 26 and the first planetary wheel carrier 50, and between the second sun wheel 28 and the second planetary wheel carrier 51, respectively. However, it is possible to arrange an additional or alternative coupling device (not displayed) between the first internal ring gear 22 and the first planetary wheel carrier 50, and also to arrange an additional or alternative coupling device (not displayed) between the second internal ring gear 28 and the second planetary wheel carrier 51.

A transmission device 19, which comprises a first gear pair 60, arranged between the first planetary gear 10 and the output shaft 20 is connected to the first and the second main shaft 34, 36. The first gear pair 60 comprises a first pinion gear 62 and a first cogwheel 64, which are in engagement with each other. A second gear pair 66 is arranged between the second planetary gear 12 and the output shaft 20. The second gear pair 66 comprises a second pinion gear 68 and a second cogwheel 70, which are in engagement with each other. A third gear pair 72 is arranged between the first planetary gear 10 and the output shaft 20. The third gear pair 72 comprises a third pinion gear 74 and a third cogwheel 76, which are in engagement with each other. A fourth gear pair 78 is arranged between the second planetary gear 12 and the output shaft 20. The fourth gear pair 78 comprises a fourth pinion gear 80 and a fourth cogwheel 82, which are in engagement with each other.

On the first main shaft 34, the first and the third pinion gears 62 and 74, respectively, are arranged. The first and the third pinion gears 62 and 74, respectively, are fixedly connected with the first main shaft 34, so that they may not rotate in relation to the first main shaft 34. On the second main shaft 36, the second and the fourth pinion gears 68 and 80, respectively, are arranged. The second and the fourth pinion gears 68 and 80, respectively, are fixedly connected with the second main shaft 36, so that they may not rotate in relation to the second main shaft 36.

The countershaft 18 extends substantially in parallel with the first and the second main shaft 34 and 36, respectively. On the countershaft 18, the first, second, third and fourth cogwheels 64, 70, 76 and 82, respectively, are mounted. The first pinion gear 62 engages with the first cogwheel 64, the second pinion gear 68 engages with the second cogwheel 70, the third pinion gear 74 engages with the third cogwheel 76 and the fourth pinion gear 80 engages with the fourth cogwheel 82.

The first, second, third and fourth cogwheels 64, 70, 76 and 82, respectively, may be individually locked with and released from the countershaft 18 with the assistance of the first, second, third and fourth coupling elements 84, 86, 88 and 90, respectively. The coupling elements 84, 86, 88 and 90, respectively, preferably consist of splines-equipped sections on the cogwheels 64, 70, 76 and 82, respectively, and on the countershaft 18, which interact with the fifth and sixth coupling sleeves 83, 85, which engage mechanically with the splines-equipped sections of the respective first to fourth cogwheel 64, 70, 76 and 82 and of the countershaft 18. The first and third coupling elements 84, 88 are preferably equipped with a common coupling sleeve 83, and the second and fourth coupling elements 86, 90 are preferably equipped with a common coupling sleeve 85. In the released state, a relative rotation may occur between the respective cogwheels 64, 70, 76 and 82 and the countershaft 18. The coupling elements 84, 86, 88 and 90, respectively, may also consist of friction couplinges. On the countershaft 18 a fifth cogwheel 92 is also arranged, which engages with a sixth cogwheel 94, which is arranged on the output shaft 20 of the gearbox 2.

The countershaft 18 is arranged between the respective first and second planetary gears 10, 12 and the output shaft 20, so that the countershaft 18 is connected with the output shaft 20 via a fifth gear pair 21, which comprises the fifth and the sixth cogwheel 92, 94. The fifth cogwheel 92 is connectable and disconnectable arranged on the countershaft 18 with the use of a fifth coupling element 93.

By disconnecting the fifth cogwheel 92, which is arranged to be disconnectable from the countershaft 18, it is possible to transfer torque from the second planetary gear 12 to the countershaft 18 via, for example, the second gear pair 66, and to further transfer torque from the countershaft 18 to the output shaft 20 via, for example, the first gear pair 60. Thus, a number of gear steps is obtained, wherein torque from one of the planetary gears 10, 12 may be transferred to the countershaft 18, and further along from the countershaft 18 to the main shaft 34, 36 connected with the second planetary gear 10, 12, in order to finally transfer torque to the output shaft 20 of the gearbox 2. This presumes, however, that a coupling mechanism 96, arranged between the first main shaft 34 and the output shaft 20, is connected, which is described in more detail below.

The fifth cogwheel 92 may be locked to and released from the countershaft 18 with the assistance of a fifth coupling element 93. The coupling element 93 preferably consists of splines-equipped sections adapted on the fifth cogwheel 92 and the countershaft 18, which sections interact with a ninth coupling sleeve 87, which engages mechanically with the splines-equipped sections of the fifth cogwheel 92 and the countershaft 18. In the released state, a relative rotation may occur between the fifth cogwheel 92 and the countershaft 18. The fifth coupling element 93 may also consist of friction couplinges.

Torque transfer from the input shaft 8 of the gearbox 2 to the output shaft 20 of the gearbox 2 may occur via the first or the second planetary gear 10 and 12, respectively, and the countershaft 18. The torque transfer may also occur directly via the first planetary gear 10, whose first sun wheel 26 is connected, via the first main shaft 34, to the output shaft 20 of the gearbox 2 via a coupling mechanism 96. The coupling mechanism 96 preferably comprises a splines-equipped seventh coupling sleeve 100, which is axially shiftable on the first main shaft 34 and on the splines-equipped sections of the output shaft 20. By shifting the seventh coupling sleeve 100, in such a way that the splines-equipped sections are connected via the seventh coupling sleeve 100, the first main shaft 34 becomes locked with the output shaft 20, which, when rotating, will therefore have the same rotational speed. By disconnecting the fifth cogwheel 92 of the fifth gear pair 21 from the countershaft 18, torque from the second planetary gear 12 may be transferred to the countershaft 18, and further along from the countershaft 18 to the first main shaft 34, connected with the first planetary gear 10, in order to finally transfer torque via the coupling mechanism 96 to the output shaft 20 of the gearbox 2.

During operation, the gearbox 2 may in some operating modes operate in such a manner that one of the sun wheels 26 and 32, respectively, is locked with the first and the second planetary wheel carrier 50 and 51, respectively, with the help of the first and the second coupling device 56 and 58, respectively. The first and the second main shaft 34 and 36, respectively, then obtain the same rotational speed as the input shaft 8 of the gearbox 2, depending on which sun wheel 26 and 32, respectively, is locked with the respective planetary wheel carriers 50 and 51. One or both of the electrical machines 14 and 16, respectively, may operate as a generator to generate electric power to the energy storage device 46. Alternatively, the electrical machine 14 and 16, respectively, may provide a torque addition, in order to thus increase the torque in the output shaft 20. In some operating modes, the electrical machines 14 and 16, respectively, will supply each other with electric power, independently of the energy storage device 46.

It is also possible that both the first and the second electrical machine 14 and 16, respectively, simultaneously generate power to the energy storage device 46. At engine braking the driver releases the accelerator pedal (not displayed) of the vehicle 1. The output shaft 20 of the gearbox 2 then operates one or both electrical machines 14 and 16, respectively, while the internal combustion engine 4 and the electrical machines 14 and 16, respectively, engine brake. In this case, the electrical machines 14 and 16, respectively, generate electric power, which is stored in the energy storage device 46 in the vehicle 1. This operating state is referred to as regenerative braking. In order to facilitate a more powerful braking effect the output shaft 97 of the internal combustion engine 4 may be locked, and thus be prevented from rotating. Thus, only one of or both the electrical machines 14 and 16, respectively, will function as a brake and generate electric power, which is stored in the energy storage device 46. The locking of the output shaft 97 of the internal combustion engine 4 may also be carried out when the vehicle has to be accelerated by only one or both the electrical machines 14 and 16. If the torque of one or both of the respective electrical machines 14 and 16 overcomes the torque off the internal combustion engine 4, and having regard to the gearing between them, the internal combustion engine 4 will not be able to resist the large torque generated by the respective electrical machines 14 and 16, so that it becomes necessary to lock the output shaft 97 of the internal combustion engine 4. Locking of the output shaft 97 of the internal combustion engine 4 may also be necessary when the vehicle 1 is reversed with the first electrical machine 14 and/or the second electrical machine 16. The locking of the output shaft 97 of the internal combustion engine 4 is preferably carried out with a locking device 102, which is arranged between the first planetary wheel carrier 50 and the gear housing 42. By locking the first planetary wheel carrier 50 and the gear housing 42, the output shaft 97 of the internal combustion engine 4 will also be locked, since the output shaft 97 of the internal combustion engines 4 is connected with the first planetary wheel carrier 50 via the input shaft 8 of the gearbox. The locking device 102 preferably comprises a splines-equipped eighth coupling sleeve 104, which is axially shiftable on a splines-equipped section of the first planetary wheel carrier 50, and on a splines-equipped section of the gear housing. By shifting the eight coupling sleeve 104 in such a manner that the splines-equipped sections are connected via the coupling sleeve 104, the first planetary wheel carrier 50, and therefore the output shaft 97 of the internal combustion engine 4, is prevented from rotating.

The control device 48 is connected to the electrical machines 14 and 16, respectively, in order to control the respective electrical machines 14 and 16 in such a way that they, during certain applicable operating modes, use stored electric power to supply driving power to the output shaft 20 of the gearbox 2, and during other operating modes use the kinetic energy of the output shaft 20 of the gearbox 2 to extract and store electric power. The control device 48 thus detects the rotational speed and/or the torque of the output shaft 97 of the internal combustion engine 4 via sensors 98 arranged at the electrical machines 14 and 16, respectively, and in the output shaft 20 of the gearbox 2, in order thus to gather information and to control the electrical machines 14 and 16, respectively, to operate either as electrical motors or generators. The control device 48 may be a computer with software suitable for this purpose. The control device 48 also controls the flow of power between the energy storage device 46 and the respective stators 40 and 44 of the electrical machines 14 and 16, respectively. At such times when the electrical machines 14 and 16, respectively, operate as engines, stored electric power is supplied from the energy storage device 46 to the respective stators 40 and 44. At such times when the electrical machines 14 and 16 operate as generators, electric power is supplied from the respective stators 40 and 44 to the energy storage device 46. However, as stated above, the electrical machines 14 and 16, respectively, may, during certain operating modes, supply each other with electric power, independently of the energy storage device 46.

The first and the second coupling devices 56 and 58, respectively, the first, second, third, fourth and fifth coupling elements 84, 86, 88, 90 and 93, respectively, the coupling mechanism 96 between the first main shaft 34 and the output shaft 20, and the locking device 102 between the first planetary wheel carrier 50 and the gear housing 42, are connected to the control device 48 via their respective coupling sleeves. These components are preferably activated and deactivated by electric signals from the control device 48. The coupling sleeves are preferably shifted by non-displayed power elements, such as hydraulically or pneumatically operated cylinders. It is also possible to shift the coupling sleeves with electrically powered power elements.

The example embodiment in FIG. 2 shows four pinion gears 62, 68, 74 and 80, respectively, and four cogwheels 64, 70, 76 and 82, respectively, as well as two respective planetary gears 10 and 12, with associated electrical machines 14 and 16. However, it is possible to adapt the gearbox 2 with more or fewer pinion gears and cogwheels, and with more planetary gears with associated electrical machines.

Below, an up-shift from a first to a seventh gear will be described, wherein the gearbox 2 is arranged in a vehicle 1. All seven gears entail forward drive of the vehicle.

The input shaft 8 of the gearbox 2 is connected to the output shaft 97 of the vehicle's 1 internal combustion engine 4. The output shaft 20 of the gearbox 2 is connected to a driving shaft 99 in the vehicle 1. At idling of the internal combustion engine 4 and when the vehicle 1 is at a standstill, the input shaft 8 of the gearbox 2 rotates at the same time as the output shaft 20 of the gearbox 2 is at a standstill. The locking device 102 is deactivated, so that the output shaft 97 of the internal combustion engine 4 may rotate freely. Since the input shaft 8 of the gearbox 2 rotates, the first planetary wheel carrier 50 will also rotate, which entails that the first set of planetary wheels 52 will rotate. Since the first planetary wheel carrier 50 is connected to the second sun wheel 32, the second sun wheel 32, and thus also the second set of planetary wheels 54, will rotate. By not supplying power to the first and the second electrical machines 14 and 16, respectively, the respective first and the second internal ring gears 22 and 28, which are connected with the respective first and second rotor 24 and 30 of the electrical machines 14 and 16, respectively, will rotate freely, so that no torque is absorbed by the respective internal ring gears 22 and 28. The respective first and the second coupling devices 56 and 58 are disconnected and thus not actuated. Thus, no torque will be transferred from the internal combustion engine 4 to the sun wheel 26 of the first planetary gear 10, or to the planetary wheel carrier 51 of the second planetary gear 12. The coupling mechanism 96 between the first main shaft 34 and the output shaft 20 is disconnected, so that the first main shaft 34 and the output shaft 20 may rotate freely in relation to each other. Since the first planetary gear's sun wheel 26, the planetary wheel carrier 51 of the second planetary gear 12 and the output shaft 20 of the gearbox 2 are, at this stage, at a standstill, the countershaft 18 is also at a standstill. In a first step the fourth cogwheel 82 and the third cogwheel 76 are connected with the countershaft 18 with the assistance of the fourth and third coupling elements 90 and 88, respectively. The first cogwheel 64 and the second cogwheel 70 are disconnected from the countershaft 18. Thus, the first cogwheel 64 and the second cogwheel 70 are allowed to rotate freely in relation to the countershaft 18. The fifth cogwheel 92 of the fifth gear pair 21 is locked on the countershaft 18 with the assistance of the fifth coupling element 93.

In order to start the rotation of the output shaft 20 of the gearbox 2, with the objective of driving the vehicle 1, the fourth pinion gear 80 and the fourth cogwheel 82 on the countershaft 18 must be brought to rotate. This is achieved by making the second planetary wheel carrier 51 rotate. When the second planetary wheel carrier 51 rotates, the second main shaft 36 will also rotate, and thus the fourth pinion gear 80, which is arranged on the second main shaft 36, also rotates. The second planetary wheel carrier 51 is made to rotate by controlling the second internal ring gear 28 with the second electrical machine 16. By activating the second electrical machine 16 and controlling the internal combustion engine 4 towards a suitable engine speed, the vehicle 1 begins to move as the second main shaft 36 begins to rotate. When the second planetary wheel carrier 51 and the second sun wheel 32 achieve the same rotational speed, the second sun wheel 32 is locked with the second planetary wheel carrier 51, with the assistance of the second coupling device 58. As mentioned above, the second coupling device 58 is preferably adapted in such a way that the second sun wheel 32 and the second planetary wheel carrier 51 engage mechanically with each other. Alternatively, the second coupling device 58 may be adapted as a slip brake or a multi-plate coupling which connects, in a smooth way, the second sun wheel 32 with the second planetary wheel carrier 51. When the second sun wheel 32 is connected with the second planetary wheel carrier 51, the second planetary wheel carrier 51 will rotate with the same rotational speed as the output shaft 97 of the internal combustion engine 4. Thus, the torque generated by the internal combustion engine 4 is transferred to the output shaft 20 of the gearbox 2 via the fourth pinion gear 80, the fourth cogwheel 82 on the countershaft 18, the fifth cogwheel 92 on the countershaft 18, and the sixth cogwheel 94 on the output shaft 20 of the gearbox 2. The vehicle 1 will thus begin to move off and be propelled by a first gear.

Each of the first, second, third and fourth gear pairs 60, 66, 72, 78 has a gearing, which is adapted to desired driving characteristics of the vehicle 1. According to the example embodiment displayed in FIG. 2, the fourth gear pair 78 has the highest gearing compared to the first, second and third gear pairs 60, 66, 72, which results in the fourth gear pair 78 being connected when the lowest gear is engaged. The second gear pair 66 transfers, as does the fourth gear pair 78, torque between the second main shaft 36 and the countershaft 18, and could instead be fitted out with the highest gearing, compared with the other gear pairs 60, 72, 78, which is why in such an embodiment the second gear pair 66 could be connected when the lowest gear is engaged.

When the countershaft 18 is made to rotate by the fourth cogwheel 82 on the countershaft 18, the third cogwheel 76 on the countershaft 18 will also rotate. Thus, the countershaft 18 operates the third cogwheel 76, which in turn operates the third pinion gear 74 on the first main shaft 34.

When the first main shaft 34 rotates, the first sun wheel 26 will also rotate, and, depending on the rotational speed of the output shaft 97 of the internal combustion engine 4 and thus on the rotational speed of the first planetary wheel carrier 50, it will cause the first internal ring gear 22 and the first rotor 24 of the first electrical machine 14 to rotate. In this case it is possible to allow the first electrical machine 14 to operate as a generator, in order to supply power to the energy storage device 46, and/or to supply power to the second electrical machine 16. It is also possible for the second electrical machine 16 to be operated as a generator. Alternatively, the first electrical machine 14 may emit a torque addition, by way of the control device 48 controlling the first electrical machine 14 to provide a driving torque.

In order to shift gears from the first to the second gear, the locking between the second sun wheel 32 and the second planetary wheel carrier 51 must cease, which is achieved by way of the first and/or the second electrical machine 14, 16 being controlled in such a way that torque balance prevails in the second planetary gear 12. Subsequently, the second coupling device 58 is controlled in such a manner that it disconnects the second sun wheel 32 and the second planetary wheel carrier 51 from each other. The second planetary wheel carrier 51 and also the second main shaft 36 may rotate freely, which entails that the second sun wheel 32, the second planetary wheel carrier 51 and the second main shaft 36 no longer operate the fourth pinion gear 80, arranged on the second main shaft 36. This assumes that the second electrical machine 16 does not operate the second ring gear 28. The second gear is connected, by way of the control device 48 controlling the internal combustion engine 4, in such a way that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. Alternatively, the first coupling device 56 may be adapted as a slip brake or a multi-plate coupling, which connects, in a smooth way, the first sun wheel 26 with the first planetary wheel carrier 50. By synchronising the control of the internal combustion engine 4 and the second and first electrical machine 14 and 16, respectively, a soft and disruption-free transition from a first to a second gear may be carried out.

The first main shaft 34 now rotates, operated by the output shaft 97 of the internal combustion engine 4, and the first main shaft 34 now operates the third pinion gear 74. The first planetary wheel carrier 50 thus operates the third pinion gear 74 via the first sun wheel 26 and the first main shaft 34. Since the third cogwheel 76 is in engagement with the third pinion gear 74 and is connected with the countershaft 18, the third cogwheel 76 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now operated with a second gear.

When the countershaft 18 is made to rotate by the third cogwheel 76, the fourth cogwheel 82 will also rotate. Thus, the countershaft 18 operates the fourth cogwheel 82, which in turn operates the fourth pinion gear 80 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second internal ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also emit a torque addition, by way of the control device 48 controlling the second electrical machine 16 towards providing a propulsion torque.

In order to shift from a second gear to a third gear, the fourth cogwheel 82 on the countershaft 18 must be disconnected from the countershaft 18 with the fourth coupling element 90, so that the fourth cogwheel 82 may rotate freely in relation to the countershaft 18. Subsequently, the countershaft 18 is connected with the second cogwheel 70 on the countershaft 18 via the second coupling element 86. In order to achieve a connection of the countershaft 18 and the second cogwheel 70 on the countershaft 18, preferably the second electrical machine 16 is controlled in such a way that a synchronous rotational speed arises between the countershaft 18 and the second cogwheel 70 on the countershaft 18. A synchronous rotational speed may be determined by way of measuring the rotational speed of the second rotor 30 in the second electrical machine 16, and by measuring the rotational speed of the output shaft 20. Thus, the rotational speed in the second main shaft 36 and the rotational speed in the countershaft 18 may be determined by way of given gear ratios. The rotational speed of the respective shafts 18, 36 is controlled, and when a synchronous rotational speed has arisen between the countershaft 18 and the second cogwheel 70, the countershaft 18 and the second cogwheel 70 are connected with the assistance of the second coupling element 86.

In order to complete the shift from a second gear to a third gear, the locking between the first sun wheel 26 and the first planetary wheel carrier 50 must cease, which is achieved by way of the first and/or the second electrical machine 14, 16 being controlled in such a way that torque balance is achieved in the first planetary gear 10, following which the first coupling device 56 is controlled in such a manner that it releases the first sun wheel 26 and the first planetary wheel carrier 50 from each other. Subsequently, the internal combustion engine 4 is controlled in such a way that a synchronous rotational speed arises between the second sun wheel 32 and the second planetary wheel carrier 51, so that the second coupling device 58 may be engaged, in order thus to connect the second sun wheel 32 with the second planetary wheel carrier 51, via the coupling sleeve 57. By synchronising the control of the internal combustion engine 4 and the second and first electrical machine 14 and 16, respectively, a soft and disruption-free transition from a second to a third gear may be carried out.

The third cogwheel 76 is disconnected by controlling the first electrical machine 14 in such a way that a substantially zero torque state arises between the countershaft 18 and the third cogwheel 76. When a substantially zero torque state arises, the third cogwheel 76 is disconnected from the countershaft 18 by controlling the third coupling element 88 in such a way that it releases the third cogwheel 76 from the countershaft 18. Subsequently, the first electrical machine 14 is controlled in such a way that a synchronous rotational speed arises between the countershaft 18 and the first cogwheel 64. When a synchronous rotational speed arises, the first cogwheel 64 is connected to the countershaft 18 by way of controlling the first coupling element 84 in such a manner that it connects the first cogwheel 64 on the countershaft 18. A synchronous rotational speed may be determined, since the rotational speed of the first rotor 24 in the first electrical machine 14 is measured and the rotational speed of the output shaft 20 is measured, following which the rotational speeds of the shafts 18, 34 are controlled in such a way that a synchronous rotational speed arises. Thus, the rotational speed of the first main shaft 34 and the rotational speed of the countershaft 18 may be determined by way of given gear ratios.

The second main shaft 36 now rotates with the same rotational speed as the output shaft 97 of the internal combustion engine 4, and the second main shaft 36 now operates the second pinion gear 68 via the second main shaft 36. Since the second cogwheel 70 is in engagement with the second pinion gear 68 and is connected with the countershaft 18, the second cogwheel 70 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a third gear.

When the countershaft 18 is made to rotate by the second cogwheel 70 on the countershaft 18, the first cogwheel 64 on the countershaft 18 will also rotate. Thus, the countershaft 18 operates the first cogwheel 64, which in turn operates the first pinion gear 62 on the first main shaft 34. When the first main shaft 34 rotates, the first sun wheel 26 will also rotate, and, depending on the rotational speed of the output shaft 97 of the internal combustion engine 4, and thus on the rotational speed of the first planetary wheel carrier 50, it will cause the first internal ring gear 22 and the first rotor 24 of the second electrical machine 16 to rotate. It is thus possible to allow the first electrical machine 14 operate as a generator, in order to supply power to the energy storage device 46, and/or to supply power to the second electrical machine 16. Alternatively, the first electrical machine 14 may emit a torque addition, by way of the control device 48 controlling the first electrical machine 14 towards providing a driving torque.

In order to complete the shift of gears from the third to the fourth gear, the locking between the second sun wheel 32 and the second planetary wheel carrier 51 must cease, which is achieved by way of the first and/or the second electrical machine 14, 16 being controlled in such a way that torque balance prevails in the second planetary gear 12, following which the second coupling device 58 is controlled in such a way that it releases the second sun wheel 32 and the second planetary wheel carrier 51 from each other. A fourth gear is subsequently connected, by way of the control device 48 controlling the internal combustion engine 4 in such a manner that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. By synchronising the control of the internal combustion engine 4 and the second and first electrical machine 14 and 16 a soft and disruption-free transition from a third to a fourth gear may be carried out.

The first main shaft 34 now rotates and is operated by the output shaft 97 of the internal combustion engine 4, and the first main shaft 34 now operates the first pinion gear 62. The first planetary wheel carrier 50 thus operates the first pinion gear 62 via the first sun wheel 26 and the first main shaft 34. Since the first cogwheel 64 is in engagement with the first pinion gear 62 and is connected with the countershaft 18, the first cogwheel 64 will operate the countershaft 18, which in turn operates the fifth cogwheel 92 on the countershaft 18. The fifth cogwheel 92 in turn operates the output shaft 20 of the gearbox 2 via the sixth cogwheel 94, which is arranged on the output shaft 20 of the gearbox 2. The vehicle 1 is now driven in a fourth gear.

When the countershaft 18 is made to rotate by the first cogwheel 64, the second cogwheel 70 will also rotate. Thus, the countershaft 18 operates the second cogwheel 70, which in turn operates the second pinion gear 68 on the second main shaft 36. When the second main shaft 36 rotates, the second planetary wheel carrier 51 will also rotate, and, depending on the rotational speed of the output shaft 97 of the internal combustion engine 4, and thus on the rotational speed in the first planetary wheel carrier 50, it will cause the second internal ring gear 28 and the second rotor 30 of the second electrical machine 16 to rotate. It is thus possible to allow the second electrical machine 16 to operate as a generator, in order to supply power to the energy storage device 46, and/or to supply power to the first electrical machine 14. The second electrical machine 16 may also emit a torque addition, by way of the control device 48 controlling the second electrical machine 16 towards providing a propulsion torque.

In order to shift gears from a fourth gear to a fifth gear, the first cogwheel 64 must be disengaged from the countershaft 18, so that the fourth gear is disengaged. This is achieved by way of controlling the internal combustion engine 4 and the first electrical machine 14, in such a way that the first cogwheel 64 is brought to a substantially zero torque state in relation to the countershaft 18. When a substantially zero torque state has arisen, the first coupling element 84 is disengaged, so that the first cogwheel 64 is disconnected from the countershaft 18.

Subsequently, the rotational speed of the first main shaft 34 is synchronized with the rotational speed of the output shaft 20, following which the coupling mechanism 96 is controlled in such a way that it connects the first main shaft 34 with the output shaft 20.

Subsequently, the internal combustion engine 4 and the first electrical machine 14 are controlled in such a way that the propulsion torque occurs via the first main shaft 34 and via the coupling mechanism 96, and further along to the output shaft 20. By reducing the torque from the second electrical machine 16, the fifth coupling element 93 may be brought to a substantially zero torque state in relation to the countershaft 18. When a substantially zero torque state has arisen, the fifth coupling element 93 is disengaged, so that the fifth cogwheel 92 of the fifth gear pair 21 is disconnected from the countershaft 18.

Subsequently, with the help of the second electrical machine 16, the rotational speed of the countershaft 18 is synchronized with the rotational speed of the third cogwheel 76, following which the third coupling element 88 is controlled in such a way that it connects the third cogwheel 76 with the countershaft 18. When this connection has been completed, the propulsion torque may be shared between the internal combustion engine 4, the first electrical machine 14 and the second electrical machine 16. Subsequently, torque balance is created in the first planetary gear 10, following which the first coupling device 56 disconnects the first planetary wheel carrier 50 and the first sun wheel 26 from each other. Finally, the rotational speed of the second planetary wheel carrier 51 is synchronized with the second sun wheel 32, following which the second coupling device 58 connects the second planetary wheel carrier 51 and the second sun wheel 32 with each other.

The second main shaft 36 now rotates, operated by the output shaft 97 of the internal combustion engine 4, and the second main shaft 36 operates the second pinion gear 68. Since the second cogwheel 70 is in engagement with the second pinion gear 68 and is connected with the countershaft 18 via the second coupling element 86, the second cogwheel 70 will operate the countershaft 18, which in turn operates the third cogwheel 76 on the countershaft 18. The third cogwheel 76 in turn operates the first main shaft 34 via the third pinion gear 74, and the output shaft 20 of the gearbox 2 is thus operated via the coupling mechanism 96, which connects the first main shaft 34 and the output shaft 20 of the gearbox 2. The vehicle 1 is now driven in a fifth gear.

In order to shift gears from the fifth to the sixth gear, the locking between the second sun wheel 32 and the second planetary wheel carrier 51 must cease, which is achieved by way of the first and/or the second electrical machine 14, 16 being controlled in such a way that torque balance is achieved in the second planetary gear 12, following which the second coupling device 58 is controlled in such a way that it releases the second sun wheel 32 and the second planetary wheel carrier 51 from each other. A sixth gear is subsequently connected, by way of the control device 48 controlling the internal combustion engine 4, in such a way that a synchronous rotational speed arises between the first planetary wheel carrier 50 and the first sun wheel 26, in order to achieve a locking between the first planetary wheel carrier 50 and the first sun wheel 26. This is achieved by way of controlling the first coupling device 56 in such a way that the first planetary wheel carrier 50 and the first sun wheel 26 are mechanically connected with each other. By synchronizing the control of the internal combustion engine 4 and the second and first electrical machine 14 and 16, respectively, a soft and disruption-free transition from a fifth to a sixth gear may be carried out.

The first main shaft 34 now rotates operated by the output shaft 97 of the internal combustion engine 4, whereat the first main shaft 34 operates the output shaft 20 of the gearbox 2 via the coupling mechanism 96, which connects the first main shaft 34 and the output shaft 20 of the gearbox 2. The vehicle 1 is now driven in a sixth gear.

In order to shift from a sixth to a seventh gear, the third cogwheel 76 on the countershaft 18 must first be disconnected from the countershaft 18 with the third coupling element 88, so that the third cogwheel 76 may rotate freely in relation to the countershaft 18. Subsequently, the countershaft 18 is connected with the first cogwheel 64 on the countershaft 18 via the first coupling element 84. When the countershaft 18 and the first cogwheel 64 on the countershaft 18 have a synchronous rotational speed, the first coupling element 84 is controlled in such a way that the first cogwheel 64 and the countershaft 18 are connected.

In order to complete the shift from a sixth gear to a seventh gear, the locking between the first sun wheel 26 and the first planetary wheel carrier 50 must cease, which is achieved by way of the first and/or the second electrical machine 14, 16 being controlled in such a way that torque balance is achieved in the first planetary gear 10, following which the first coupling device 56 is controlled, in such a way that it releases the first sun wheel 26 and the first planetary wheel carrier 50 from each other. Subsequently, the internal combustion engine 4 is controlled in such a way that a synchronous rotational speed arises between the second sun wheel 32 and the second planetary wheel carrier 51, so that the second coupling device 58 may be engaged in order thus to connect the second sun wheel 32 with the second planetary wheel carrier 51, via the coupling sleeve 57. By synchronizing the control of the internal combustion engine 4 and the second and first electrical machine 14 and 16, respectively, a soft and disruption-free transition from a sixth to a seventh gear may be carried out.

The second main shaft 36 now rotates with the same rotational speed as the output shaft 97 of the internal combustion engine 4, and the second main shaft 36 operates the second pinion gear 68. Since the second cogwheel 70 is in engagement with the second pinion gear 68 and is connected with the countershaft 18, the second cogwheel 70 will operate the countershaft 18, which in turn operates the first cogwheel 64 on the countershaft 18. The first cogwheel 64 in turn operates the first main shaft 34 via the first pinion gear 62, and the output shaft 20 of the gearbox 2 is thus operated via the coupling mechanism 96, which connects the first main shaft 34 and the output shaft 20 of the gearbox 2. The vehicle 1 is now driven in a seventh gear.

According to the embodiment above, the gearbox 2 comprises pinion gears 62, 68, 74, 80 and cogwheels 64, 70, 76, 82 arranged on the main shafts 34, 36 and the countershaft 18, respectively, to transfer rotational speed and torque. However, it is possible to use another type of transmission, such as chain and belt drives, to transfer rotational speed and torque in the gearbox 2.

The transmission device 19 has four gear pairs 60, 66, 72, 78 according to the example embodiment. However, the transmission device 19 may comprise any number of gear pairs.

Figure 3A:
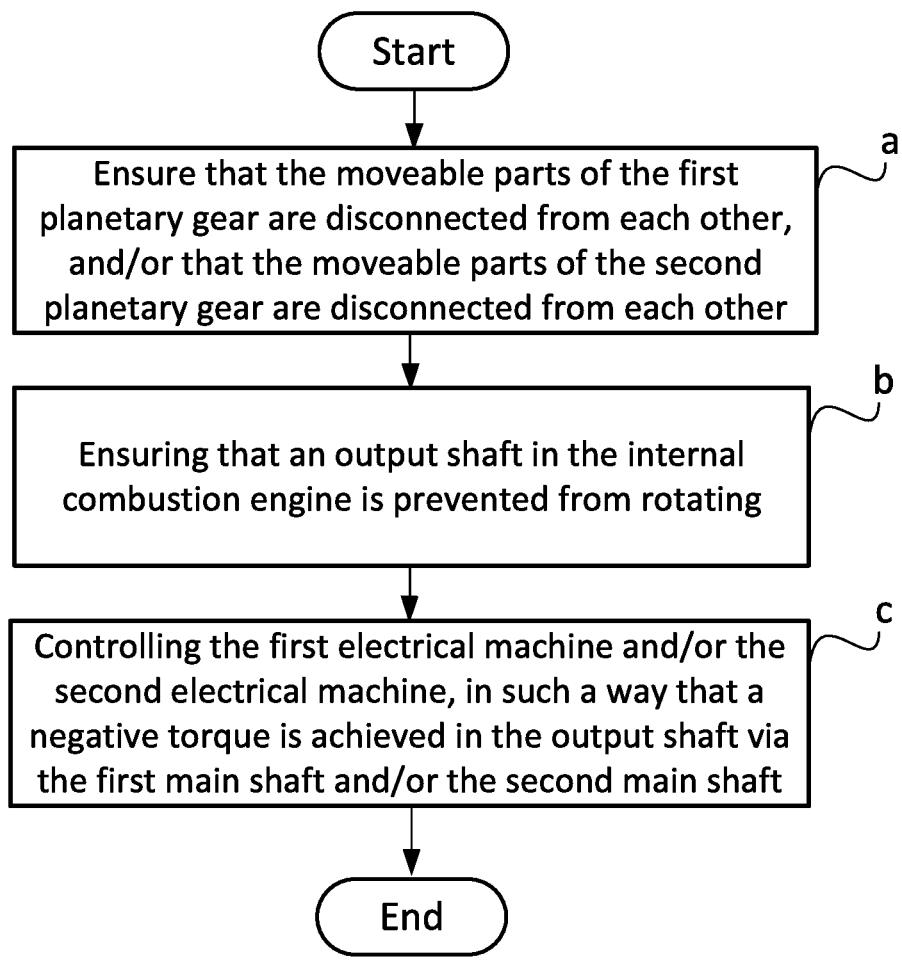
Figure 3B:
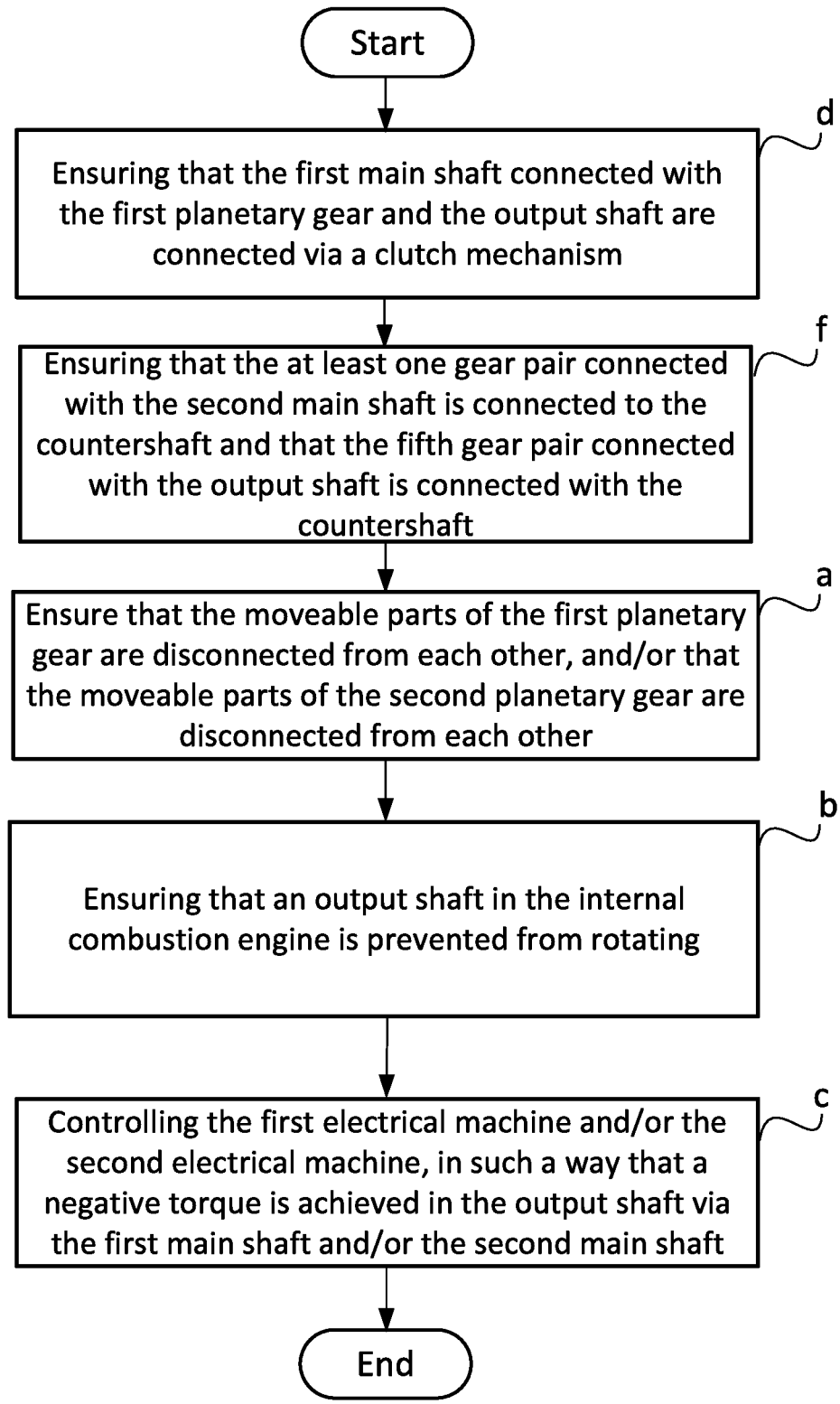

In order to achieve propulsion of the vehicle in a reverse direction, a special control of the hybrid powertrain is required, as described in FIG. 3a-3c.

FIG. 3a shows a flow chart relating to a method to control a hybrid powertrain 3, in order to achieve reverse drive, wherein the hybrid powertrain 3 comprises an internal combustion engine 4; a gearbox (2) with an input shaft 8 and an output shaft 20; a first planetary gear 10, connected to the input shaft 8 and a first main shaft 34; a second planetary gear 12, connected to the first planetary gear 10 and a second main shaft 36; a first electrical machine 14, connected to the first planetary gear 10; a second electrical machine 16, connected to the second planetary gear 12; at least one gear pair 60, 72 connected with the first main shaft 34 and the output shaft 20; and at least one gear pair 66, 78, connected with the second main shaft 36 and the output shaft 20, wherein the internal combustion engine 4 is connected with the first planetary gear 10 via the input shaft 8. The hybrid powertrain 3 is suitably adapted as described in FIG. 2. Method comprising the steps:

a) ensure that the moveable parts 22, 26, 50 of the first planetary gear 10 are disconnected from each other, and/or that the moveable parts 28, 32, 51 of the second planetary gear 12 are disconnected from each other;

b) ensuring that an output shaft 97 in the internal combustion engine 4 is prevented from rotating; and c) controlling the first electrical machine 14 and/or the second electrical machine 16, in such a way that a negative torque is achieved in the output shaft 20 via the first main shaft 34 and/or the second main shaft 36.

In cases where the vehicle is driven forward when the method described herein is initiated, the moveable parts 22, 26, 50 of the first planetary gear 10 are disconnected by controlling the first and/or the second electrical machine 14, 16 in such a way that torque balance is achieved in the first planetary gear 10, whereat the first coupling device 56 is shifted, so that the first planetary gear's 10 planetary wheel carrier 50 and the first sun wheel 26 are disconnected from each other. In the same manner, the moveable parts 28, 32, 51 of the second planetary gear 12 are disconnected by way of controlling the first and/or the second electrical machine 14, 16, in such a way that torque balance is achieved in the second planetary gear 12, following which the second coupling device 58 is shifted, so that the planetary wheel carrier 51 in the second planetary gear 12 and the second sun wheel 32 are disconnected from each other.

Preferably, the method comprises, before step a), ensuring that the output shaft 20 is connected with the first and/or the second electrical machine 14, 16. In this manner, torque transmission from the first and/or the second electrical machine 14, 16 to the output shaft 20 is facilitated.

The internal combustion engine's 4 output shaft 97 is connected with the first planetary wheel carrier 50 arranged in the first planetary gear 10, and the step b) comprises ensuring that a locking device 102 is locked, so that the first planetary wheel carrier 50 is locked to the gear house 42 of the gearbox 4. Alternatively, step b) comprises controlling a braking element (not displayed), arranged in connection with the output shaft 97 of the internal combustion engine 4, so that the output shaft 97 of the internal combustion engine 4 is decelerated to a standstill.

Preferably, step c) comprises controlling the first electrical machine 14, in order to achieve a rotation of the first electrical machine 14 in a first direction, wherein the output shaft 20 is made to rotate in an opposite, second direction. The first direction is a positive direction. Suitably, the first electrical machine 14 is controlled in such a manner that it emits a positive torque, so that a rotation of the first electrical machine 14 in the first direction is achieved. The positive torque from the first electrical machine 14 acts on the first sun wheel 26, and thus on the first main shaft 34, so that they may rotate in a second direction, opposite to the first direction. That is to say, the positive torque from the first electrical machine 14 results in the first sun wheel 26 and thus the first main shaft 34 being able to obtain a negative rotational speed direction.

Preferably, step c) comprises control of the second electrical machine 16, in order to achieve a rotation of the second electrical machine 16 in a second direction, wherein the output shaft 20 is made to rotate in the same, second direction. The second direction is a negative direction. Suitably, the second electrical machine 16 is controlled in such a manner that it emits a negative torque, so that the rotation of the second electrical machine 16 in the second direction is achieved. The negative torque from the second electrical machine 16 acts on the second planetary wheel carrier 51, and thus on a second main shaft 36 connected with the second planetary wheel carrier 51, so that they may rotate in the same, second direction. That is to say, the result of the negative torque from the second electrical machine 16 is that the second planetary wheel carrier 51 and the second main shaft 36 may obtain a negative rotational speed direction.

FIG. 3b shows a flow chart relating to a method to control hybrid powertrain 3 according to FIG. 3a, wherein the negative torque in the output shaft 20 is achieved through the step—before the step a)

d) of ensuring that the first main shaft 34 connected with the first planetary gear 10 and the output shaft 20 are connected via a coupling mechanism 96.

This ensures that the output shaft 20 is connected with the first and/or the second electrical machine 14, 16.

Suitably, step d) comprises achieving a synchronous rotational speed between the first main shaft 34 connected with the first planetary gear 10 and the output shaft 20, following which the coupling mechanism 96 is shifted, so that it connects the first main shaft 34 and the output shaft 20. Suitably, a synchronous rotational speed between the first main shaft 34 and the output shaft 20 is achieved via the internal combustion engine 4 and/or the first electrical machine 14. The synchronous rotational speed between the first planetary gear 10 and the first main shaft 34 may be zero.

By connecting the first main shaft 34 and the output shaft 20, the output shaft 20 obtains the same rotational speed direction as the first main shaft 34. When the first electrical machine 14 is controlled in order to achieve a negative torque in the output shaft 20, and this results in the first main shaft 34 obtaining a negative rotational speed direction, the output shaft 20 obtains the same negative rotational speed direction. In this manner, a direct gear is achieved, whereat the first electrical machine 14 may achieve a negative torque in the output shaft 20 without any connected gear pair.

Suitably, the method also comprises the step of, before step a):

f) ensuring that the at least one gear pair 66, 78 connected with the second main shaft is connected to the countershaft 18, and that the fifth gear pair 21 connected with the output shaft 20 is connected with the countershaft 18.

This ensures that the output shaft 20 is connected with the first and/or the second electric machine 14, 16.

The connection of a gear pair 66, 78 connected with the second main shaft 36 is achieved in accordance with the description relating to FIG. 2. The fifth gear pair 21 is suitably connected with the countershaft 18 by way of controlling the internal combustion engine 4 and/or the first electrical machine 14, in such a manner that a synchronous rotational speed is achieved between the fifth gear pair 21 and the countershaft 18, following which the fifth coupling element 93 is shifted, so that the fifth gear pair 21 is connected to the countershaft 18.

By connecting a gear pair 66, 78, connected with the second main shaft 36, to the countershaft 18, the countershaft 18 will obtain a rotational speed direction opposite to the second main shaft 36. When the second electrical machine 16 is controlled in order to achieve a negative torque in the output shaft 20, and this results in the second main shaft 36 obtaining a negative rotational speed direction, the countershaft 18 obtains a positive rotational speed direction. Since the countershaft 18 is connected with the output shaft 20 via the fifth gear pair 21, a positive rotational speed direction in the countershaft 18 will entail that the output shaft 20 may obtain a negative rotational speed direction.

FIG. 3c shows a flow chart relating to a method to control hybrid powertrain 3 according to FIG. 3a, wherein the negative torque in the output shaft 20 is achieved through the step—before the step a)

e) ensuring that the at least one gear pair 60, 72 connected with the first main shaft 34 is connected to the countershaft 18, and that a fifth gear pair 21 connected with the output shaft 20 is connected to the countershaft 18.

This ensures that the output shaft 20 is connected with the first and/or the second electrical machine 14, 16.

The connection of a gear pair 60, 72 connected with the first main shaft 34 is achieved in accordance with the description relating to FIG. 2. The fifth gear pair 21 is suitably connected with the countershaft 18 by way of controlling the internal combustion engine 4 and/or the first electrical machine 14, in such a manner that a synchronous rotational speed is achieved between the fifth gear pair 21 and the countershaft 18, following which the fifth coupling element 93 is shifted, so that the fifth gear pair 21 is connected to the countershaft 18.

Since a gear pair 60, 72 connected with the first main shaft 34 is connected to the countershaft 18, a negative rotational speed direction in the first main shaft 34 means that the countershaft 18 obtains a positive rotational speed direction. Since the countershaft 18 is connected with the output shaft 20 via the fifth gear pair 21, a positive rotational speed direction in the countershaft 18 will entail that the output shaft 20 obtains a negative rotational speed direction. By controlling the first electrical machine 14 in such a way that it generates a positive torque, a negative rotational speed direction may thus be achieved in the output shaft 20 in a flexible manner.

Suitably, the method also comprises the step of, before step a):

f) ensuring that the at least one gear pair 66, 78 connected with the second main shaft 36 is connected with the countershaft 18, and that the fifth gear pair 21 connected with the output shaft 20 is connected with the countershaft 18.

This ensures that the output shaft 20 is connected with the first and/or the second electrical machine 14, 16.

The connection of a gear pair 66, 78 connected with the second planetary gear 12 is achieved in accordance with the description relating to FIG. 2. The fifth gear pair 21 is suitably connected with the countershaft 18 by way of controlling the internal combustion engine 4 and/or the first electrical machine 14, in such a manner that a synchronous rotational speed is achieved between the fifth gear pair 21 and the countershaft 18, following which the fifth coupling element 93 is shifted, so that the fifth gear pair 21 is connected to the countershaft 18.

By connecting a gear pair 66, 78 connected with the second planetary gear 12 to the countershaft 18, the countershaft 18 obtains a rotational speed direction which is opposite to that of the second main shaft 36. When the second electrical machine 16 is controlled in order to achieve a negative torque in the output shaft 20, and this results in the second main shaft 36 obtaining a negative rotational speed direction, the countershaft 18 obtains a positive rotational speed direction. Since the countershaft 18 is connected with the output shaft 20 via the fifth gear pair 21, a positive rotational speed direction in the countershaft 18 will entail that the output shaft 20 may obtain a negative rotational speed direction.

According to the invention, a computer program P is provided, stored in the control device 48 and/or the computer 53, which may comprise procedures to control the hybrid powertrain 3 according to the present invention.

The program P may be stored in an executable manner, or in a compressed manner, in a memory M and/or a read/write memory.

The invention also relates to a computer program product, comprising program code stored in a medium readable by a computer, in order to perform the method steps specified above, when said program code is executed in the control device 48, or in another computer 53 connected to the control device 48. Said program code may be stored in a non-volatile manner on said medium readable by a computer 53.

The components and features specified above may, within the framework of the invention, be combined between different embodiments specified.

The invention claimed is:

1. A method to control a hybrid powertrain in order to achieve reverse drive, comprising the steps of:
    (a) providing a hybrid powertrain, the hybrid powertrain comprising:
        an internal combustion engine;
        a gearbox with an input shaft and an output shaft;
        a first planetary gear connected to the input shaft and a first main shaft, wherein the first planetary gear comprises a first wheel carrier, a first sun wheel, a first planet wheel, and a first ring gear;
        a second planetary gear connected to the first planetary gear and a second main shaft, wherein the second planetary gear comprises a second wheel carrier, a second sun wheel, a second planet wheel, and a second ring gear;
        a first electrical machine connected to the first planetary gear;
        a second electrical machine connected to the second planetary gear;
        at least one gear pair connected with the first main shaft and the output shaft; and
        at least one gear pair connected with the second main shaft and the output shaft,
        wherein the internal combustion engine is connected with the first planetary gear via the input shaft,
    (b) ensuring that:
        1) two or more of the first wheel carrier, the first sun wheel, the first planetary wheel, and the first ring gear of the first planetary gear are disconnected from each other by a first coupling device, and/or
        2) two or more of the second wheel carrier, the second sun wheel, the second planetary wheel, and the second ring gear of the second planetary gear are disconnected from each other by a second coupling device;
    (c) ensuring that an output shaft of the internal combustion engine is prevented from rotating; and
    (d) controlling at least one of:
        1) the first electrical machine through the first main shaft, and/or
        2) the second electrical machine through the second main shaft,
        such that a negative torque is achieved at the output shaft by either one or both of the first and second electrical machines.

2. A method according to claim 1, wherein the negative torque in the output shaft is achieved by the step of, prior to step b):
    e) ensuring that the first main shaft, which is connected with the first planetary gear, and the output shaft are connected to each other by means of a coupling mechanism.

3. A method according to claim 1, wherein the negative torque at the output shaft is achieved by the step of, prior to step b):
    f) ensuring that the at least one gear pair connected with the first main shaft is connected to the countershaft and that a fifth gear pair, which is connected with the output shaft, is connected to the countershaft.

4. A method according to claim 1, wherein the output shaft of the internal combustion engine is connected with a first planetary wheel carrier arranged in the first planetary gear and that step b) comprises ensuring that a locking device is locked, so that the planetary wheel carrier is locked to the gear housing of the gearbox.

5. A method according to claim 1, wherein the at least one gear pair connected with the first main shaft comprises a first pinion gear and a cogwheel in engagement with each other, which pinion gear is fixedly arranged with the first main shaft and which cogwheel is connectable and disconnectable arranged on a countershaft.

6. A method according to claim 1, wherein the at least one gear pair connected with the second main shaft comprises a pinion gear and a cogwheel in engagement with each other, which pinion gear is fixedly arranged with the second main shaft and which cogwheel is connectable and disconnectable arranged on the countershaft.

7. A method according to claim 1, wherein step d) comprises controlling the first electrical machine such that the first electrical machine rotates in a first direction, and the output shaft rotates in an opposite, second direction.

8. A method according to claim 1, further comprising the additional step of, prior to step b):
   g) ensuring that the at least one gear pair connected with the second main shaft is connected to the countershaft, and that a fifth gear pair connected with the output shaft is connected to the countershaft.

9. A method according to claim 1, wherein step d) comprises controlling the second electrical machine such that the second electrical machine rotates in a second direction, and the output shaft rotates in the same, second direction.

10. A vehicle having a hybrid powertrain capable of achieving reverse drive, comprising:
    an internal combustion engine;
    a gearbox with an input shaft and an output shaft;
    a first planetary gear connected to the input shaft and a first main shaft, wherein the first planetary gear comprises a first wheel carrier, a first sun wheel, a first planet wheel, and a first ring gear;
    a second planetary gear connected to the first planetary gear and a second main shaft, wherein the second planetary gear comprises a second wheel carrier, a second sun wheel, a second planet wheel, and a second ring gear;
    a first electrical machine connected to the first planetary gear; a second electrical machine connected to the second planetary gear;
    at least one gear pair connected with the first main shaft and the output shaft; and
    at least one gear pair connected with the second main shaft and the output shaft, wherein the internal combustion engine is connected with the first planetary gear via the input shaft;
    wherein said hybrid powertrain is controlled to achieve reverse drive by:
    a) ensuring that: 1) two or more of the first wheel carrier, the first sun wheel, the first planetary wheel, and the first ring gear of the first planetary gear are disconnected from each other by a first coupling device, and/or 2) two or more of the second wheel carrier, the second sun wheel, the second planetary wheel, and the second ring gear of the second planetary gear are disconnected from each other by a second coupling device;
    b) ensuring that an output shaft of the internal combustion engine is prevented from rotating; and
    c) controlling at least one of: 1) the first electrical machine through the first main shaft, and/or 2) the second electrical machine through the second main shaft, such that a negative torque is achieved at the output shaft by either one or both of the first and second electrical machines.

11. A vehicle according to claim 10, wherein the negative torque in the output shaft is achieved by the step of, prior to step a):
    d) ensuring that the first main shaft, which is connected with the first planetary gear, and the output shaft are connected to each other by means of a coupling mechanism.

12. A vehicle according to claim 10, wherein the negative torque in the output shaft is achieved by the step of, prior to step a):
    e) ensuring that the at least one gear pair connected with the first main shaft is connected to the countershaft and that a fifth gear pair, which is connected with the output shaft, is connected to the countershaft.

13. A vehicle according to claim 10, wherein the output shaft of the internal combustion engine is connected with a first planetary wheel carrier arranged in the first planetary gear and that step b) comprises ensuring that a locking device is locked, so that the planetary wheel carrier is locked to the gear housing of the gearbox.

14. A vehicle according to claim 10, wherein the at least one gear pair connected with the first main shaft comprises a first pinion gear and a cogwheel in engagement with each other, which pinion gear is fixedly arranged with the first main shaft and which cogwheel is connectable and disconnectable arranged on a countershaft.

15. A computer program product comprising:
    program code stored in a non-transitory computer-readable medium readable by a computer,
    said computer program product used to control a hybrid powertrain in order to achieve reverse drive, wherein the hybrid powertrain comprises:
    an internal combustion engine; a gearbox with an input shaft and an output shaft;
    a first planetary gear connected to the input shaft and a first main shaft, wherein the first planetary gear comprises a first wheel carrier, a first sun wheel, a first planet wheel, and a first ring gear;
    a second planetary gear connected to the first planetary gear and a second main shaft, wherein the second planetary gear comprises a second wheel carrier, a second sun wheel, a second planet wheel, and a second ring gear;
    a first electrical machine connected to the first planetary gear;
    a second electrical machine connected to the second planetary gear;
    at least one gear pair connected with the first main shaft and the output shaft; and
    at least one gear pair connected with the second main shaft and the output shaft,
    wherein the internal combustion engine is connected with the first planetary gear via the input shaft,
    said computer program code comprising computer instructions to cause one or more computer processors to perform the operations of:
    a) operating with the first planetary gear connected with the first electrical machine is connected to the second planetary gear connected to the second electrical machine;
    b) ensuring that: 1) two or more of the first wheel carrier, the first sun wheel, the first planetary wheel, and the first ring gear of the first planetary gear are disconnected from each other by a first coupling device, and/or 2) two or more of the second wheel carrier, the second sun wheel, the second planetary wheel, and the second ring gear of the second planetary gear are disconnected from each other by a second coupling device;

c) ensuring that an output shaft of the internal combustion engine is prevented from rotating; and d) controlling at least one of: 1) the first electrical machine through the first main shaft, and/or 2) the second electrical machine through the second main shaft, such that a negative torque is achieved at the output shaft by either one or both of the first and second electrical machines.

16. A computer program product according to claim 15, wherein the negative torque in the output shaft is achieved by further computer instructions performed before computer instructions a) of:

d) ensuring that the first main shaft, which is connected with the first planetary gear, and the output shaft are connected to each other by means of a coupling mechanism.

17. A computer program product according to claim 15, wherein the negative torque at the output shaft is achieved by further computer instructions performed before computer instructions a) of:

e) ensuring that the at least one gear pair connected with the first main shaft is connected to the countershaft and that a fifth gear pair, which is connected with the output shaft, is connected to the countershaft.

18. A computer program product according to claim 15, wherein the output shaft of the internal combustion engine is connected with a first planetary wheel carrier arranged in the first planetary gear and that computer instructions b) comprises ensuring that a locking device is locked, so that the planetary wheel carrier is locked to the gear housing of the gearbox.

19. A computer program product according to claim 15, wherein the at least one gear pair connected with the first main shaft comprises a first pinion gear and a cogwheel in engagement with each other, which pinion gear is fixedly arranged with the first main shaft and which cogwheel is connectable and disconnectable arranged on a countershaft.

* * * * *